(12) United States Patent
Dlala

(10) Patent No.: US 11,025,113 B2
(45) Date of Patent: Jun. 1, 2021

(54) HYBRID ROTOR ASSEMBLY

(71) Applicant: Atieva, Inc., Newark, CA (US)

(72) Inventor: Emad Dlala, Pleasanton, CA (US)

(73) Assignee: Atieva, Inc., Redwood City, CA (US)

( * ) Notice: Subject to any disclaimer, the term of this patent is extended or adjusted under 35 U.S.C. 154(b) by 34 days.

(21) Appl. No.: 16/453,305

(22) Filed: Jun. 26, 2019

(65) Prior Publication Data

US 2020/0412190 A1    Dec. 31, 2020

(51) Int. Cl.
| | | |
|---|---|---|
| *H02K 1/27* | (2006.01) | |
| *H02K 1/28* | (2006.01) | |
| *H02K 1/26* | (2006.01) | |
| *H02K 1/02* | (2006.01) | |
| *H01F 1/08* | (2006.01) | |
| *H02K 15/03* | (2006.01) | |
| *H02K 17/16* | (2006.01) | |
| *H02K 21/16* | (2006.01) | |
| *H02K 3/04* | (2006.01) | |

(52) U.S. Cl.
CPC ............... *H02K 1/28* (2013.01); *H01F 1/086* (2013.01); *H02K 1/02* (2013.01); *H02K 1/26* (2013.01); *H02K 3/04* (2013.01); *H02K 15/03* (2013.01); *H02K 17/165* (2013.01); *H02K 21/16* (2013.01)

(58) Field of Classification Search
CPC ...... H02K 1/27; H02K 1/2706; H02K 1/2766; H02K 2201/06
See application file for complete search history.

(56) References Cited

U.S. PATENT DOCUMENTS

| | | | | |
|---|---|---|---|---|
| 2007/0096578 A1* | 5/2007 | Jahns | .................. | H02K 1/2766 310/156.53 |
| 2013/0241340 A1* | 9/2013 | Koga | .................. | H02K 1/2773 310/156.56 |
| 2016/0380492 A1* | 12/2016 | Kawasaki | .............. | H02K 1/146 310/156.11 |

* cited by examiner

*Primary Examiner* — Dang D Le
(74) *Attorney, Agent, or Firm* — Brake Hughes Bellermann LLP

(57) ABSTRACT

A hybrid rotor assembly is provided. The assembly utilizes two different types of magnets within the lamination cavities of the lamination stack: sintered permanent magnets and bonded magnets.

13 Claims, 6 Drawing Sheets

HYBRID ROTOR ASSEMBLY

FIELD OF THE INVENTION

The present invention relates generally to electric motors and, more particularly, to a hybrid rotor design that achieves high torque density and high efficiency.

BACKGROUND OF THE INVENTION

In response to the demands of consumers who are driven both by ever-escalating fuel prices and the dire consequences of global warming, the automobile industry is slowly starting to embrace the need for ultra-low emission, high efficiency cars. While some within the industry are attempting to achieve these goals by engineering more efficient internal combustion engines, others are incorporating hybrid or all-electric drivetrains into their vehicle line-ups. To meet consumer expectations, however, the automobile industry must not only achieve a greener drivetrain, but must do so while maintaining reasonable levels of performance, range, reliability, safety and cost.

The most common approach to achieving a low emission, high efficiency car is through the use of a hybrid drivetrain in which an internal combustion engine (ICE) is combined with one or more electric motors. While hybrid vehicles provide improved gas mileage and lower vehicle emissions than a conventional ICE-based vehicle, due to their inclusion of an internal combustion engine they still emit harmful pollution, albeit at a reduced level compared to a conventional vehicle. Additionally, due to the inclusion of both an internal combustion engine and an electric motor(s) with its accompanying battery pack, the drivetrain of a hybrid vehicle is typically more complex than that of either a conventional ICE-based vehicle or an all-electric vehicle, resulting in increased cost and weight. Accordingly, several vehicle manufacturers are designing vehicles that only utilize an electric motor, thereby eliminating one source of pollution while significantly reducing drivetrain complexity.

While a variety of hybrid and all-electric vehicles are known, it is critical that drive train efficiency is maximized in order to meet user expectations with regards to MPGe and vehicle range. The present invention provides a rotor design optimized for both efficiency and torque.

SUMMARY OF THE INVENTION

The present invention provides a rotor assembly for an electric motor comprising (i) a rotor shaft; (ii) a lamination stack mounted on the rotor shaft; (iii) a plurality of lamination cavities within the lamination stack, each of which is defined by a first portion and a second portion; (iv) a plurality of sintered permanent magnets contained within the first portion of the plurality of lamination cavities; and (v) a plurality of bonded magnets contained within the second portion of the plurality of lamination cavities. The plurality of sintered permanent magnets may be comprised of a material selected from the group of materials consisting of ferrite, ceramic, alnico, samarium cobalt, neodymium and neodymium-iron-boron. The bonded magnets are comprised of a magnetic material and a binder, where the magnet material may be selected from the group of materials consisting of samarium, samarium cobalt, neodymium, neodymium-iron-boron and strontium ferrite, and where the binder may be selected from the group of materials consisting of nylon, polyphenylene sulfide, epoxy and polyamide. The bonded magnets may consist of isotropic or anisotropic bonded magnets. The bonded magnets may consist of injection molded bonded magnets or compression molded bonded magnets. The plurality of lamination cavities may be configured as pairs, with each pair corresponding to a pole of the electric motor. The plurality of lamination cavities may be configured as pairs, with each pair arranged in a V-shaped configuration. The electric motor may be an interior permanent magnet motor, a permanent magnet synchronous motor, an interior permanent magnet brushless DC motor, or an interior permanent magnet synchronous reluctance motor.

A further understanding of the nature and advantages of the present invention may be realized by reference to the remaining portions of the specification and the drawings.

BRIEF DESCRIPTION OF THE DRAWINGS

It should be understood that the accompanying figures are only meant to illustrate, not limit, the scope of the invention and should not be considered to be to scale. Additionally, the same reference label on different figures should be understood to refer to the same component or a component of similar functionality.

DESCRIPTION OF THE SPECIFIC EMBODIMENTS

As used herein, the singular forms "a", "an" and "the" are intended to include the plural forms as well, unless the context clearly indicates otherwise. The terms "comprises", "comprising", "includes", and/or "including", as used herein, specify the presence of stated features, integers, steps, operations, elements, and/or components, but do not preclude the presence or addition of one or more other features, integers, steps, operations, elements, components, and/or groups thereof. As used herein, the term "and/or" and the symbol "/" are meant to include any and all combinations of one or more of the associated listed items. As used herein, the terms "electric vehicle" and "EV" are interchangeable and may refer to an all-electric vehicle, a plug-in hybrid vehicle, also referred to as a PHEV, or a hybrid vehicle, also referred to as a HEV, where a hybrid vehicle utilizes multiple sources of propulsion including an electric drive system. Additionally, while the terms first, second, etc. may be used herein to describe various steps or calculations, these steps or calculations should not be limited by these terms, rather these terms are only used to distinguish one step or calculation from another. For example, a first calculation could be termed a second calculation; similarly a first step could be termed a second step; similarly a first component could be termed a second component, all without departing from the scope of this disclosure.

Figure 1:
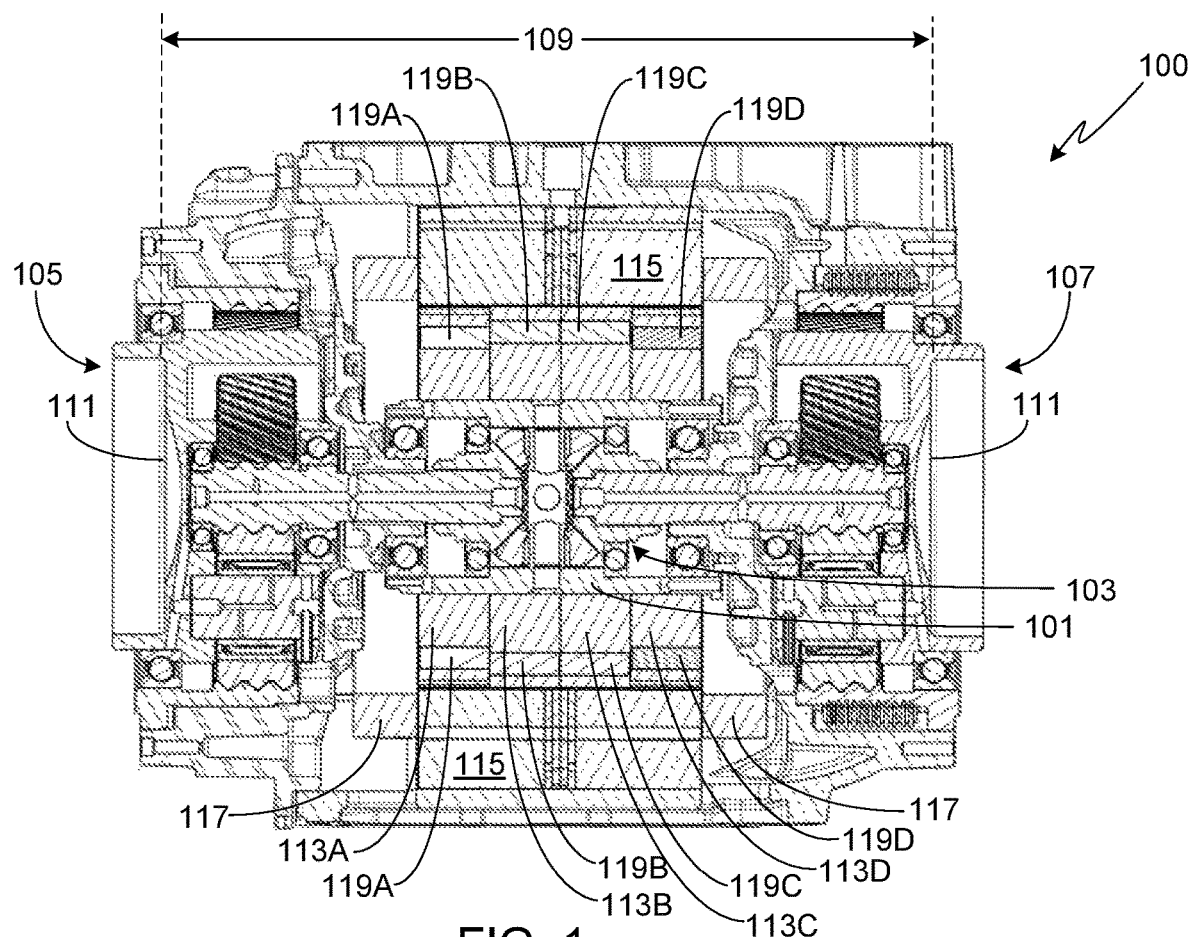
FIG. 1 provides a cross-sectional view of a powertrain assembly that may be used with the present invention.

FIG. 1 provides a cross-sectional view of an exemplary powertrain assembly 100. As described in detail below, a powertrain assembly such as that shown in FIG. 1 may be used in a conventional configuration or modified in accordance with the invention. It should be understood that powertrain assembly 100 is simply an exemplary motor configuration used to illustrate the invention and that the invention may be used with other electric motor configurations. Furthermore, an electric motor designed and configured in accordance with the invention may be employed in either EV or non-EV applications.

In the illustrated assembly, a hollow rotor shaft 101 is employed. Hollow rotor shaft 101 contains differential gear assembly 103. This configuration allows the powertrain to be arranged such that planetary assembly 105, differential gear assembly 103, and planetary assembly 107 are coaxially aligned, thereby creating a powertrain with a relatively short width 109, where width 109 is measured between the bottom surfaces 111 of the two constant velocity (i.e., CV) joint housing members.

Figure 2:
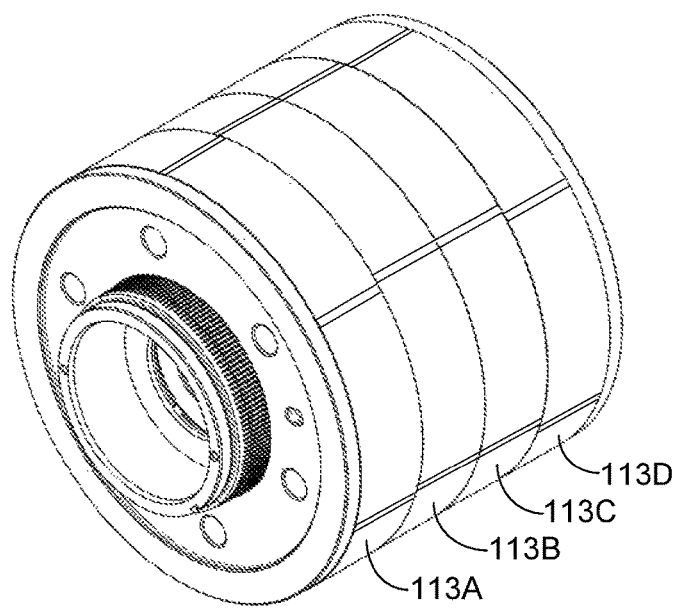
FIG. 2 provides a perspective view of the lamination stack of the powertrain assembly shown in FIG. 1.

The lamination stack used in assembly 100 is comprised of four lamination sections 113A-113D, also commonly referred to as lamination layers, with each lamination layer comprised of a plurality of lamination discs. While not required, dividing the rotor lamination stack into several sections and skewing those sections relative to one another is a common approach used to reduce cogging torque, and thus undesirable noise, vibration and harshness (NVH) characteristics. FIG. 2 provides a perspective view of the lamination stack of assembly 100. Surrounding the rotor lamination stack is stator 115. Visible in this view are the stator windings 117 that extend from either end of the stator.

In the cross-sectional view of assembly 100 provided by FIG. 1, the permanent magnets within each section are visible. Specifically, within layer 113A permanent magnets 119A are visible; within layer 113B permanent magnets 119B are visible; within layer 113C permanent magnets 119C are visible; and within layer 113D permanent magnets 119D are visible. Typically the permanent magnets used in an electric motor, and more specifically an electric motor used in an EV, are sintered and manufactured from a suitable magnetic material such as ferrite, ceramic, alnico, samarium cobalt, neodymium and neodymium-iron-boron.

While sintered permanent magnets are typically used in EV applications due to their high efficiency and magnetic force density or flux density, some electric motors utilize a second type of magnetic material commonly referred to as a bonded magnet. Bonded magnets utilize particles of a magnetic material (e.g., samarium cobalt, neodymium-iron-boron, strontium ferrite, etc.) that are embedded within a binder. Typical binders include nylon, polyphenylene sulfide, epoxy and polyamide. The bonded magnets are formed via injection molding or compression molding, the latter approach offering higher magnetic strength due to the ability to utilize higher magnetic particle densities. In general, bonded magnets are used in less demanding, lower performance motor applications (e.g., hard disk drives, copiers, consumer appliances and electronics, etc.) because their magnetic properties are lower than those of a comparably sized sintered magnet due to the inclusion of the non-magnetic binding material. The advantage of bonded magnets, however, is that they may be formed into complex shapes and, if necessary, be molded directly into a component.

Figure 3:
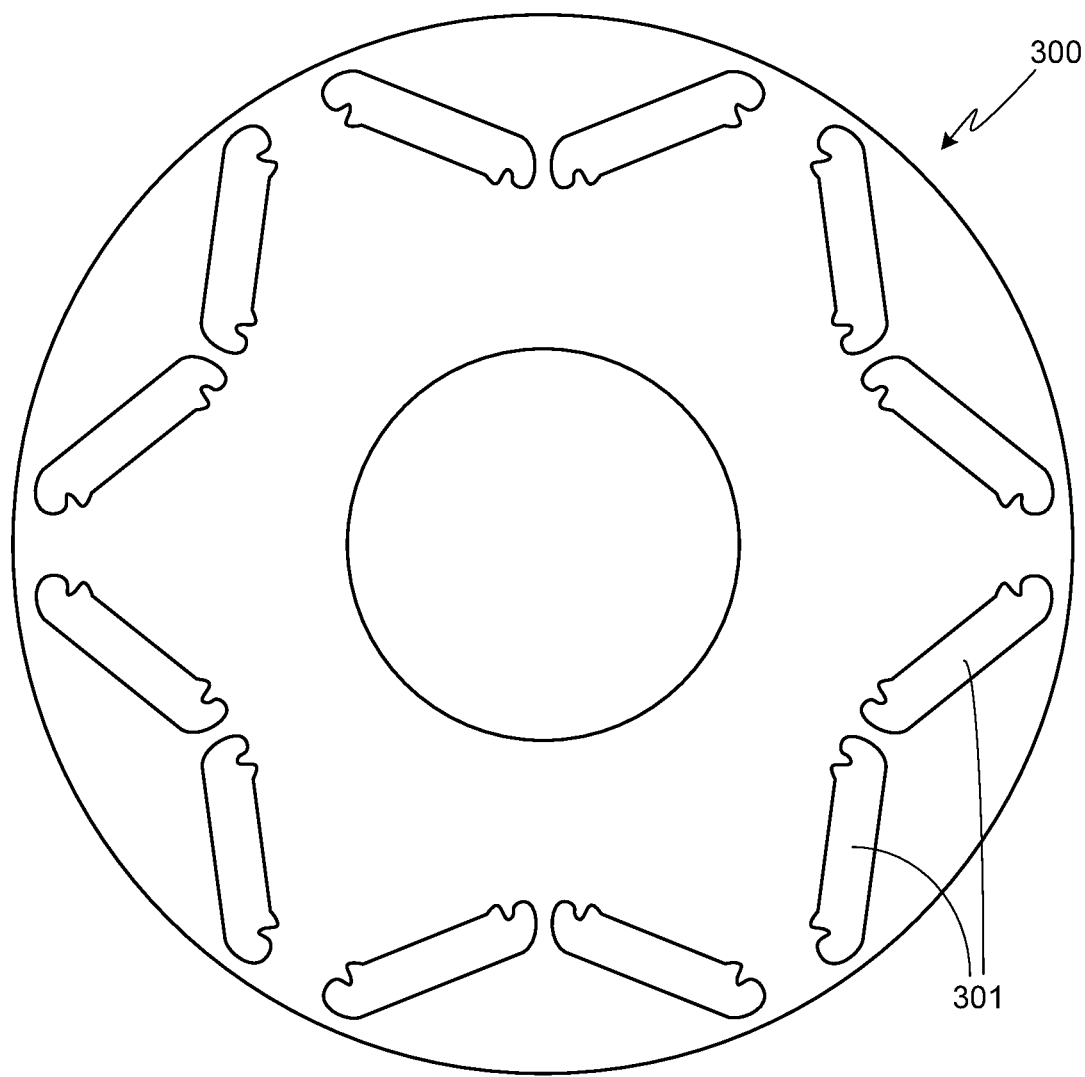
FIG. 3 provides a cross-sectional view of a rotor lamination.
Figure 4:
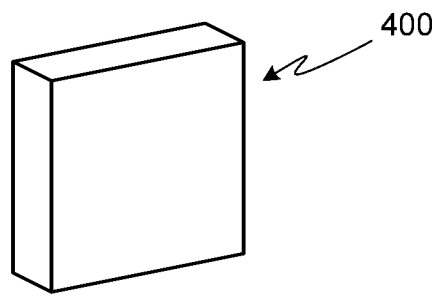
FIG. 4 provides a perspective view of a sintered magnet suitably shaped to fit within the lamination cavities of the rotor lamination shown in FIG. 3.
Figure 5:
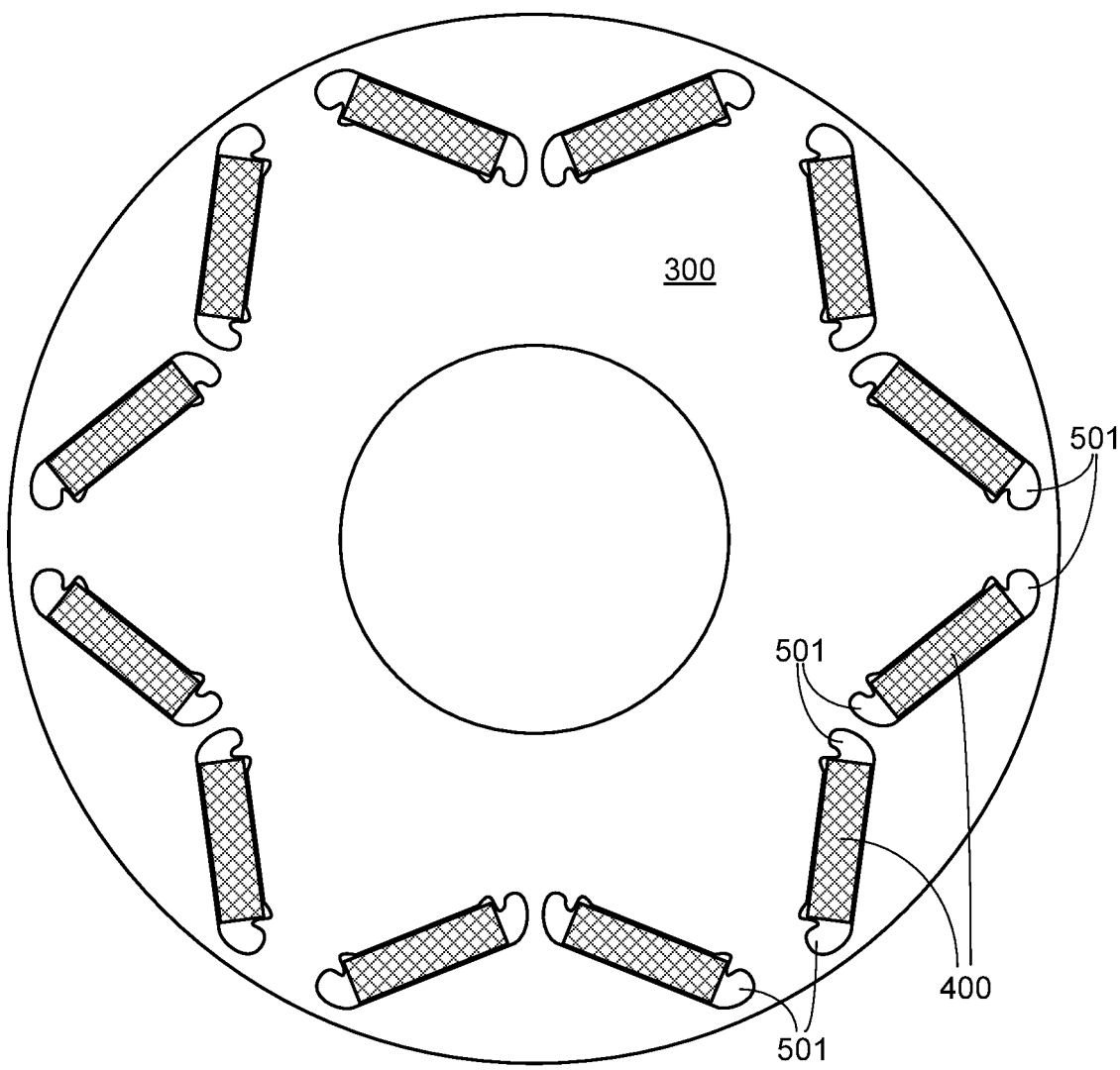
FIG. 5 provides a cross-sectional view of the rotor lamination shown in FIG. 3 with the sintered magnets of FIG. 4 located within the lamination cavities.
Figure 6:
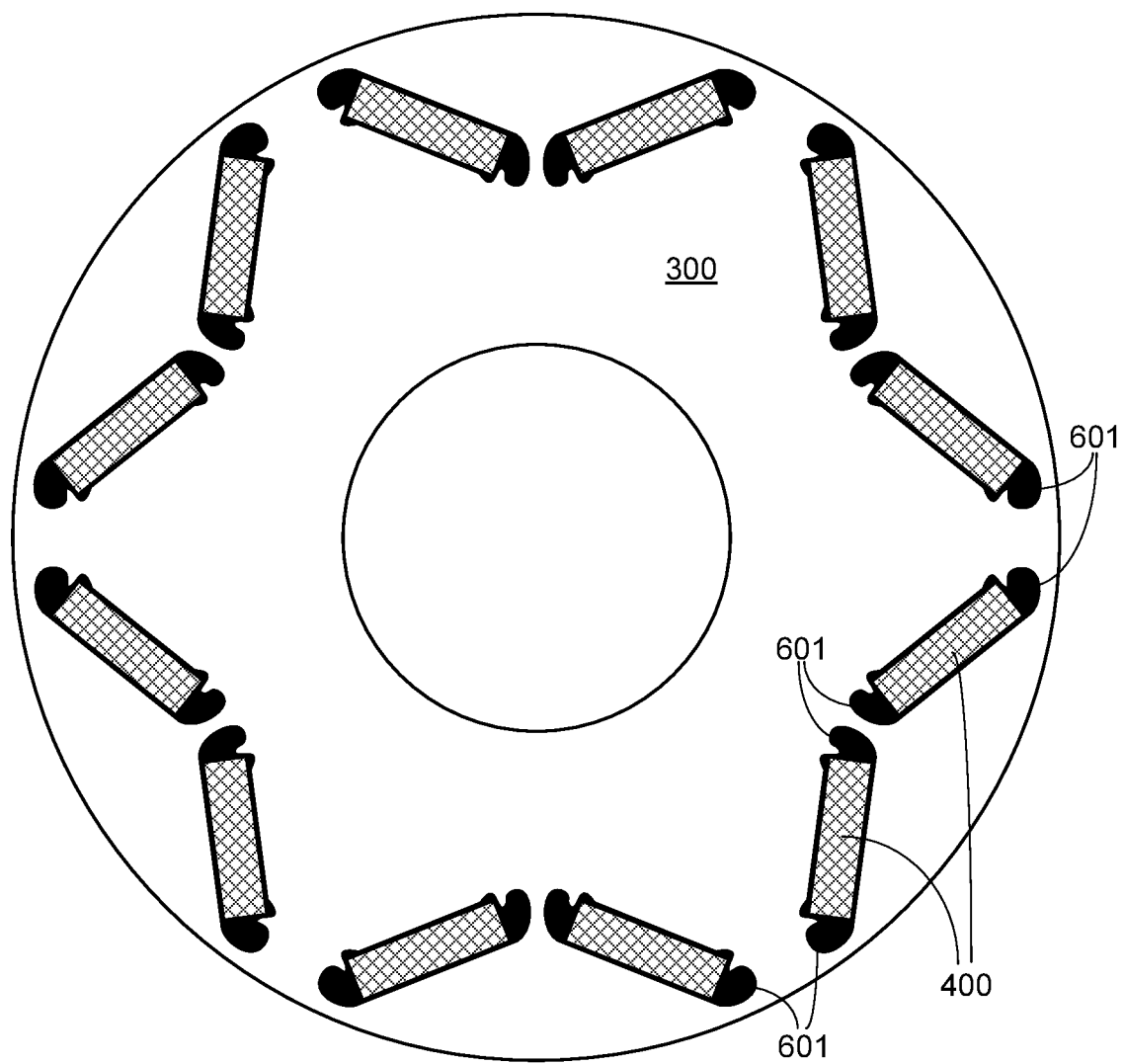
FIG. 6 provides a similar cross-sectional view to that provided by FIG. 5, except that an epoxy material is used to fill the voids in the lamination cavities after inclusion of the sintered magnets.

FIG. 3 provides a cross-sectional view of a typical rotor lamination 300. As shown, this lamination includes twelve lamination cavities 301, also referred to as lamination voids. Assuming the use of sintered magnets as preferred for an EV motor, lamination cavities 301 are configured to accept a cuboid-shaped magnet 400 as illustrated in FIG. 4. FIG. 5 provides a cross-sectional view of rotor lamination 300 with magnets 400 in place. Preferably magnets 400 are arranged in a V-shaped configuration as shown, although it will be appreciated that other magnet configurations are equally applicable. In a typical motor, voids 501 may be kept empty as shown, or filled with a thermosetting polymer such as an epoxy material 601 as illustrated in FIG. 6. The use of an epoxy, such as an epoxy thermosetting resin, ensures that the magnets remain firmly in place, thereby creating a mechanically rigid stack. Additionally, by filling in the voids between the magnets and the slots in the lamination stack (e.g., voids 501 shown in FIG. 5), the epoxy resin prevents oils from stagnating within the voids which can, in turn, create imbalances within the stack. Furthermore, given that the epoxy resin has better thermal properties than air, filling the voids with epoxy resin creates a lamination stack with more uniform thermal properties. Typically an epoxy resin injection molding process is used to apply the bonding material to the lamination stack.

Figure 7:
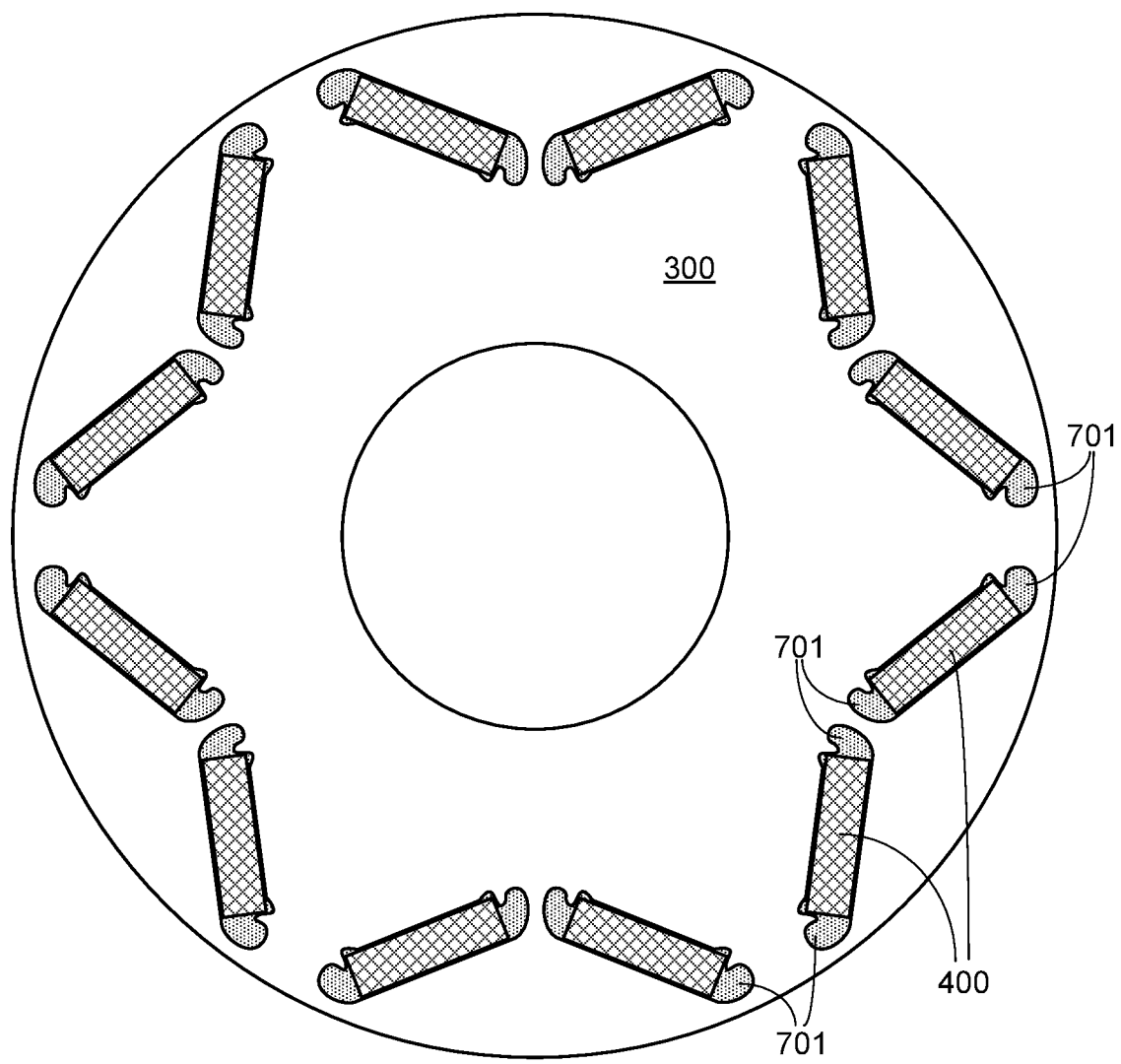
FIG. 7 provides a similar cross-sectional view to that provided by FIG. 5, except that in accordance with the invention a bonded magnetic material is used to fill the voids in the lamination cavities after inclusion of the sintered magnets.

In accordance with the invention, a hybrid magnet rotor configuration is employed in which bonded magnets are located in the voids remaining after insertion of the sintered magnets in the lamination cavities. FIG. 7 illustrates this embodiment, this figure providing the cross-sectional view of rotor lamination 300 with sintered magnets 400 inserted into the lamination cavities and with bonded magnets 701 filling voids 501. Preferably either an injection molding or a compression molding process is used to fill voids 501 with bonded magnets 701.

In at least one preferred embodiment of the invention, the bonded magnets use neodymium or samarium as the magnetic material and a polymer such as nylon or polyamide as the binding agent. The inventor has found that the intrinsic coercive force for both the sintered magnets and the bonded magnets should be similar in the temperature range of interest in order to ensure robust motor operation and prevent demagnetization.

Bonded magnets may be isotropic and exhibit the same properties in all directions, or anisotropic and have a preferred directionality. The directionality of the bonded magnet may be due to the properties (e.g., crystalline structure) of the magnetic material used to form the bonded magnet, or the directionality may derive from specific processing or post-processing steps. In general the inventor has found that while either isotropic or anisotropic bonded magnets may be used in the invention, anisotropic magnets are preferred in order to achieve optimal performance gains from the hybrid magnet rotor.

Figure 8:
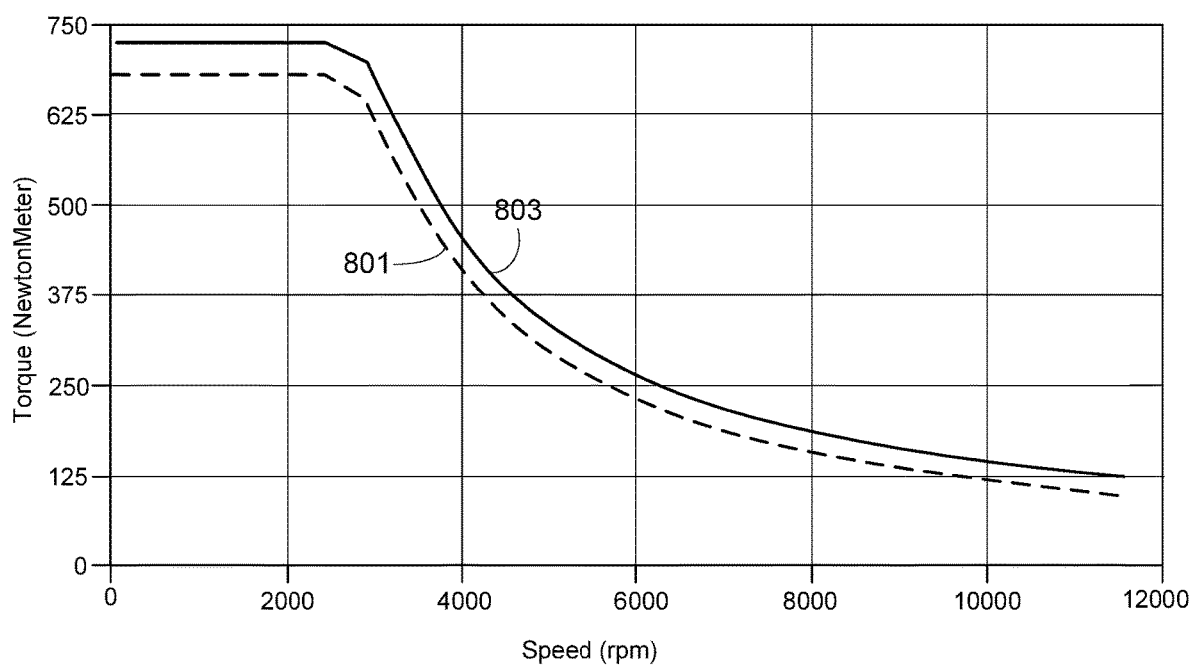
FIG. 8 graphically illustrates the benefits of the present invention utilizing an exemplary motor design.

FIG. 8 illustrates the benefits of the present invention utilizing an exemplary motor design. Curve 801 graphs motor torque versus motor speed for this motor with a standard rotor, where the standard rotor uses sintered permanent magnets and in which voids 501 in the lamination cavities are filled with an epoxy (see FIG. 6). Curve 803 graphs the same motor characteristics for this same motor design, but in which voids 501 are filled with a bonded, anisotropic magnetic material (see FIG. 7). As shown, performance increased in the range of 6 to 10 percent. Using the motor with the rotor fabricated in accordance with the invention as the traction motor in an EV, the gain in motor efficiency was over 1 percent (average of an EPA drive cycle).

It should be understood that the invention is equally applicable to any motor utilizing permanent magnets within the rotor. Exemplary motor types for which the invention is applicable include (i) interior permanent magnet (IPM) motors; (ii) permanent magnet synchronous motors (PMSM); (iii) IPM brushless DC motors; and (iv) IPM synchronous reluctance motors.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:

1. An electric motor comprising:
   a stator;
   a rotor assembly comprising:
      a hollow rotor shaft;
      a differential gear assembly contained in the hollow rotor shaft;
      a lamination stack mounted on said hollow rotor shaft;
      a plurality of lamination cavities within said lamination stack, wherein each of said plurality of lamination cavities is defined by a first portion and a second portion, the lamination stack defining, for each of the plurality of lamination cavities, first and second tabs that extend into the lamination cavity;
      a plurality of sintered permanent magnets corresponding to said plurality of lamination cavities, wherein said plurality of sintered permanent magnets is contained within said first portion of said plurality of lamination cavities, and wherein the first and second tabs abut the sintered permanent magnet at opposite ends thereof; and
      a plurality of bonded magnets corresponding to said plurality of lamination cavities, wherein said plurality of bonded magnets is contained within said second portion of said plurality of lamination cavities, wherein each of the first and second tabs abuts one of the bonded magnets; and
   a first planetary assembly positioned at a first end of the rotor assembly, and a second planetary assembly positioned at a second end of the rotor assembly, wherein the first and second planetary assemblies and the differential gear assembly are coaxially aligned.

2. The electric motor of claim 1, wherein said plurality of sintered permanent magnets are comprised of a material selected from the group of materials consisting of ferrite, ceramic, alnico, samarium cobalt, neodymium and neodymium-iron-boron.

3. The electric motor of claim 1, wherein said plurality of bonded magnets are comprised of a magnetic material and a binder.

4. The electric motor of claim 3, wherein said magnetic material is selected from the group of materials consisting of samarium, samarium cobalt, neodymium, neodymium-iron-boron and strontium ferrite.

5. The electric motor of claim 3, wherein said binder is selected from the group of materials consisting of nylon, polyphenylene sulfide, epoxy and polyamide.

6. The electric motor of claim 1, wherein said plurality of bonded magnets consist of a plurality of anisotropic bonded magnets.

7. The electric motor of claim 1, wherein said plurality of bonded magnets consist of a plurality of isotropic bonded magnets.

8. The electric motor of claim 1, wherein said plurality of bonded magnets consist of injection molded bonded magnets.

9. The electric motor of claim 1, wherein said plurality of bonded magnets consist of compression molded bonded magnets.

10. The electric motor of claim 1, wherein said plurality of lamination cavities are configured as a plurality of pairs, wherein each pair corresponds to a pole of said electric motor.

11. The electric motor of claim 1, wherein said plurality of lamination cavities are configured as a plurality of pairs, wherein each pair of said plurality of pairs is arranged in a V-shaped configuration.

12. The electric motor of claim 1, wherein said electric motor is selected from the group consisting of interior permanent magnet motors, permanent magnet synchronous motors, interior permanent magnet brushless DC motors, and interior permanent magnet synchronous reluctance motors.

13. The electric motor of claim 1, wherein both of the first and second tabs are positioned on a same side of the lamination cavity.

* * * * *